June 5, 1923.

C. REUSE

ELASTIC WHEEL

Filed March 2, 1920

1,457,396

Inventor
Charles Reuse
By A. Singer
Atty.

Patented June 5, 1923.

1,457,396

UNITED STATES PATENT OFFICE.

CHARLES REUSE, OF BRUSSELS, BELGIUM.

ELASTIC WHEEL.

Application filed March 2, 1920. Serial No. 362,855.

*To all whom it may concern:*

Be it known that I, CHARLES REUSE, a subject of the King of Belgium, residing at Quai au Charbon 25, Hal, Brussels, Belgium, have invented new and useful Elastic Wheels, of which the following is a specification.

It has already been proposed to use blocks of rubber or like material capable of elastic deformation for damping or deadening the shocks, vibration and oscillation in mechanisms for haulage, in couplings, in suspensions, in wheels and so forth.

Such blocks have in particular been employed as dowels or plugs by means of which rigid members are elastically assembled; for example, the radial spokes on the nave have been thus joined to the rim in certain vehicle wheels.

The elastic material of which the dowel blocks is made is shaped to correspond with recesses suited to the desired deformation. The material may also be armoured in order that the stresses applied may be distributed throughout the mass of the blocks.

Such elastic means of assembly present many advantages over arrangements of metallic springs which they replace; they have a greater capacity for absorbing shock, they are more readily applied, are less subject to breakage, re-act more gently, and so on.

Unfortunately the repeated deformation and continual friction to which the blocks in question are generally exposed cause a harmful heating and rapid destruction of the elastic material so that hitherto mechanisms assembled in this fashion were not durable.

The present invention has for its purpose a construction permitting the utilization of the effects of deformation of caoutchouc blocks in producing a continuous circulation of pulverized graphite on the total surface of these blocks and particularly on the surface which is in contact with the metallic parts elastically mounted by these blocks.

A specific embodiment of the invention is shown in the annexed drawing in connection with an elastic vehicle wheel.

Figure 1:
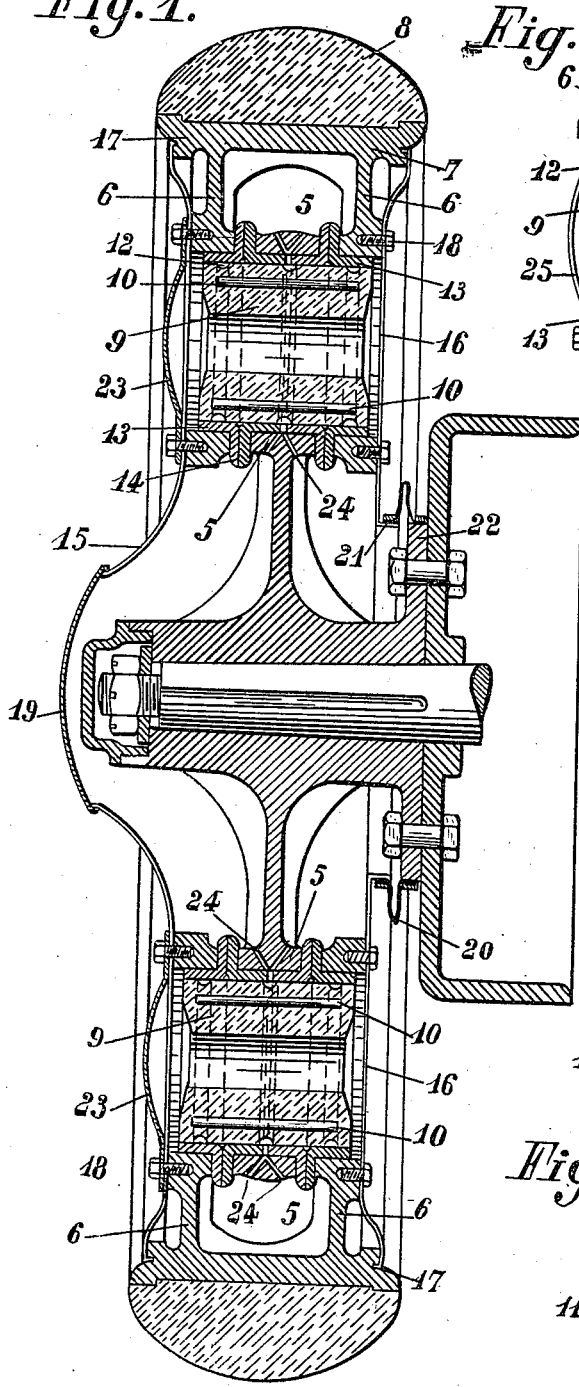
Figure 1 is a transverse section of a wheel with elastic blocks such that a continuous circulation of pulverized graphite on the total surface of the blocks is obtained automatically on the rotation of the wheel.

As shown in Fig. 1 the radial arms of the hub of the wheel end each in an annular disc 5 forming a bracket bored parallel with the axis of the wheel. This bracket can slide freely between two corresponding brackets 6, 6, integral with the rigid felly 7 encircled by the tyre 8.

The elastic assembling of the rigid brackets 5 6, 6, is effected by a dowel block 9 of soft rubber forming a plug.

This plug which has an axial opening through it is provided longitudinally with a series of buried metallic reinforcements such as 10. It has longitudinal slots 11 upon its surface which may be supplemented by annular grooves 12. The bores of the annular brackets 5 and 6 have removable linings 13, the flanges 14 of which form contacting guide surfaces.

In the construction shown in Figure 1 the space within the felly 7 is closed on each side by annular discs of dished metal plates 15, 16.

These sheet metal discs each have an exterior flange engaging in a groove 17 in the felly. They are fastened on the outside against the faces of the brackets 6, 6 of this felly by bolts 18 or in any other suitable manner.

The central opening of the disc 15 is closed by a removable cover 19 and the hole is so shaped as to leave the hub of the wheel quite free to move while giving ready access to its cap.

Openings provided in the sheet 15 opposite the bores of the bracket 6 are also closed by removable covers 23. The central opening of the disc 16 is closed by a flexible sleeve 20 of beaten leather, rubber or other impermeable material, which makes joint between the flange 21 of this opening and the edge of a plate 22 provided upon the hub of the wheel. In the closed chamber thus formed between the two metal sheets the desired quantity of graphite is introduced by removal of the cover 19. In the same way a suitable quantity of graphite is placed in the lodgments containing the rubber blocks by the removal of the covers 23. The circulation of the graphite thus introduced is brought about by the rotation of the wheel and by the deformation of the blocks. In the construction according to Figure 1 the graphite put in the centre of the wheel circulates round the brackets 5 and 6 and across the lodgments for the blocks through holes 24 under the suction and compression produced by the deformation of the blocks.

At the same time the graphite put directly into the lodgments is similarly circulated around the blocks as the result of their deformation.

The slots and channels 11 and 12 in the blocks further facilitate this circulation. It will be noted that an annular space is left between the two linings 13 of each bracket 5 on the hub and this corresponds to the middle groove in the rubber block and to the openings of the passages 24.

Figure 2:
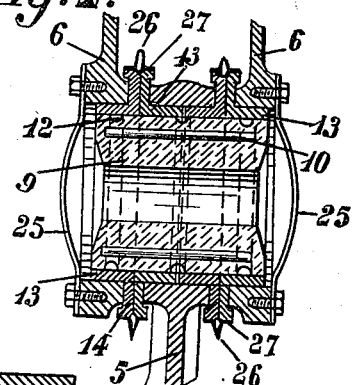
Figure 2 is a fragmentary view similar to Figure 1 of a modification.
Figure 3:
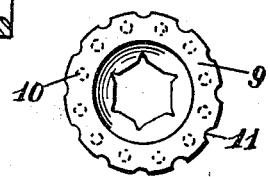
Figs. 3 and 4 are respectively end and side elevations of one of the elastic assembly blocks or dowels.
Figure 4:
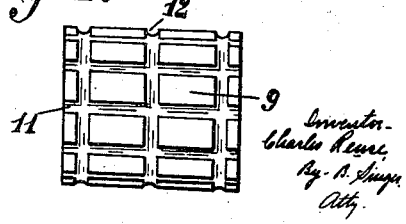

In the modification shown in Figure 2 the wheel is not closed by sheet metal discs. Only the bores of the twin brackets 6, 6 are closed on their outer surface by suitable covers 25. In this case the graphite placed in the lodgments and in the central hole through the block circulates simply around the block. Consequently the passages 24, shown in Figure 1, are absent. The adjacent flanges of the linings of the brackets 5 and 6 are connected by means of a flexible sleeve 26 compressed at its ends by collars 27 so that the escape of graphite from the lodgment is prevented.

The purpose of the invention is to secure a continual supply of graphite to the whole surface of each elastic block so that all parts of this surface exposed to friction and to deformation are constantly coated and infiltrated by the graphite which is the conserving and lubricating material for the rubber. This result is secured by the effect of the rotation of the wheel and the continual deformation suffered by the blocks in their lodgments. These deformations result in a succession of compressions and rarefactions of greater or less intensity of the air in each lodgment and this results in a sucking in or pressing out of the graphite into and from the lodgments. In this way there results an actual circulation of graphite across the lodgments for the blocks and around the blocks which serve in a sense as suction and compression valves. These valves are thus bathed in a current of graphite dust which they set in motion, a current which at the same time dusts the rubbing surfaces of the lodgments in which the block is enclosed. The complete lubrication of all rubbing parts is thus ensured automatically and methodically. It is methodic because the rate of circulation of the graphite in the lodgments around each block is proportional the speed of frictional movement between the rubbing surfaces and to the amplitude of the deformation of the blocks.

The stretching that the rubber undergoes in consequence of this continual deformation opens its surface pores and so permits of a superficial infiltration of the graphite. The molecular friction resulting from deformation which is more prominent in the superficial parts is thus lessened by the constant lubrication by graphite and so the harmful heating and rapid destruction of the rubber are avoided, the graphite hindering the hardening and splitting of the rubber. Thus the graphite acts as a preservative for the rubber and maintains its elasticity.

Having now particularly described and ascertained the nature of my said invention and in what manner the same is to be performed, I declare that what I claim is:—

1. In a wheel, a felloe having members provided with openings, a hub having members provided with openings arranged between those of the felloe members, so that said felloe and hub members are arranged for relative eccentric movement, elastic blocks in said openings, connecting said felloe members and hub members together, and means coacting with said felloe members to form lubricant containing chambers in which said openings and said elastic blocks are arranged.

2. In a wheel, a felloe having members provided with openings, a hub having members provided with openings arranged between those of the felloe members, so that said felloe and hub members are arranged for relative eccentric movement, elastic blocks in said openings, connecting said felloe members and hub members together, and means coacting with said felloe members to form lubricant containing chambers in which said openings and said elastic blocks are arranged, said blocks having peripheral ducts and said hub members having ducts leading to said openings from said chambers.

In testimony whereof I affix my signature in presence of two witnesses.

CHARLES REUSE.

Witnesses:
L. BARETTE,
GEO. J. BALDER.